Patented Jan. 28, 1941

2,229,651

UNITED STATES PATENT OFFICE 2,229,651

PROCESS OF ALCOHOLYSIS

William Edward Hanford and Walter Edwin Mochel, Wilmington, Del., assignors to E. I. du Pont de Nemours & Company, Wilmington, Del., a corporation of Delaware No Drawing. Application August 17, 1939, Serial No. 290,683

17 Claims. (Cl. 260—615)

This invention relates to the preparation of organic compounds and, more particularly, to the preparation of ortho esters, $RC(OR')_3$, and, still more particularly, to the preparation of alkyl orthoformates.

This invention has as an object the preparation of alkyl ortho esters. A further object is the preparation of alkyl orthoformates. A still further object is the preparation of alkyl orthoformates in better yields and at lower costs than by any of the methods hitherto described.

These objects are accomplished by the following invention wherein ortho trithioesters, more particularly alkyl ortho trithioesters, and preferably alkyl orthotrithioformates, are reacted with alkanols in the presence of catalysts of acidic reaction to obtain alkyl ortho esters, e. g., alkyl orthoformates, and the liberated thiols or derivatives thereof.

The process of this invention comprises the reaction of an ortho trithioester, e. g., ethyl orthotrithioformate, with an alkanol in the presence of a suitable catalyst. The most important ortho trithioesters, viz., the orthotrithioformates, are readily prepared by the reaction of a thiol, e. g., ethanethiol, with methyl formate in the presence of an acidic catalyst. In its preferred embodiment, the ortho ester preparation is carried out in the presence of an acidic catalyst, such as zinc chloride or p-toluenesulfonic acid in an apparatus so designed that the low-boiling thiol may be removed from the reaction mixture by distillation as it forms. This thiol is then suitable for the preparation of more of the orthotrithioformate. When the theoretical amount of thiol has been removed, the excess alkanol is removed by distillation, and the product removed and purified by distillation from the reaction vessel. The reaction involved in this process is an equilibrium reaction. Therefore, in order to get a good yield, it is essential that the thiol be removed as it forms. If this is not done, for example, if the reaction is carried out in a closed vessel, an equilibrium is reached with consequent decrease in yield.

The more detailed practice of the invention is illustrated by the following examples, wherein parts given are by weight. There are of course many forms of the invention other than these specific embodiments.

Example I

A mixture of 98 parts of triethyl orthotrithioformate, 92 parts absolute ethanol, and 2 parts of fused zinc chloride is refluxed at atmospheric pressure for 10 hours in a still so arranged that the evolved ethanethiol can be removed from the reaction mixture by distillation as it is formed. When the theoretical amount of thiol has been obtained, the excess alcohol is taken off and the residue distilled directly from the reaction flask. A total of 49 parts of ethyl orthoformate is obtained. This is a yield of 66%. The boiling point is 144–146° C.

Example II

A mixture of 59 parts of triethyl orthotrithioformate, 89 parts of butanol, and 2 parts of fused zinc chloride is heated in a still so that the ethanethiol can be removed by distillation as it is formed. After 48 hours 80% of the theoretical weight of ethanethiol has been removed. The excess butanol is then removed by distillation and the product distilled from the reaction vessel, giving 11 parts of butyl orthoformate at 240–244° C. Refractive index at 23°, 1.4198.

Example III

A mixture of 59 parts of triethyl orthotrithioformate, 69 parts of absolute ethanol, and 1 part of p-toluenesulfonic acid is heated at atmospheric pressure in a still provided with a column and the ethanethiol removed by distillation at 37–40° C. as it is formed. The product in the still is then washed twice with 10% sodium hydroxide solution to neutralize the p-toluenesulfonic acid. The product is distilled, and after all the alcohol has been removed, a total of 26 parts of ethyl orthoformate is obtained, distilling at 142–145° C. Refractive index at 25°, 1.3979. A modified [see Sampey & Reid, J. Am. Chem. Soc. 54, 3404 (1932)] iodine number analysis of the ethanethiol fraction indicates that 79% of the theoretical amount of ethanethiol has been removed. The neutralization and washing may be omitted without any essential decrease in yield.

While exemplified in the above examples as applied to triethyl orthotrithioformate which is readily obtainable, the process of the present invention is generically applicable to any orthotrithioester, including triethyl, trimethyl, tributyl, tribenzyl, tri-p-cresyl, trinaphthyl, triallyl, etc. esters of orthotrithio carboxylic acids. The esters of tetrathioorthocarbonic acid may also be used in the process of the present invention. The esters to which the process of the invention is applicable may be formulated as $R'C(SR)_3$ wherein R' is hydrogen, SR, or a monovalent organic radical and R is a monovalent radical, the non-hydroxyl residue of an organic non-acidic hydroxyl compound, i. e., of an alcohol or phenol. Thus R may be aliphatic, aromatic, araliphatic, alicyclic or heterocyclic, but is preferably alkyl, and R' may be aliphatic, aromatic, araliphatic, alicyclic, heterocyclic. R' is preferably hydrogen or a hydrocarbon radical, i. e., alkyl, aryl, or aralkyl.

The process is of particular advantage in its application to the reaction of trithioorthoformates. These are readily prepared in good yields from thiols and formic acid, its esters or formamide. See Holmberg, Ber. 40 1741-3 (1907). Thus, ethanethiol and methyl formate may be reacted in the presence of dry hydrogen chloride, or of other acidic catalysts. Other thiols than ethanethiol may also be used, such as methanethiol, butanethiol, phenylmethanethiol, p-thiocresol, α-thionaphthol, and allylthiol (Houben and Schultze, Ber. 44, 3235-41 (1911)), giving compounds having the general formula $HC(SR)_3$. The orthotrithioformates may also be prepared from chloroform and sodium mercaptides.

In the reaction of the present invention, the orthotrithioester or tetrathioorthocarbonate is reacted with any alcohol including alkanols, alkenols, aralkanols, cycloalkanols, heterocyclic alcohols, etc., including ethanol, butanol, pentanol, allyl alcohol, cyclohexanol, benzyl alcohol, ethylene chlorohydrin, ethyl glycolate, furfuryl alcohol, etc.

The invention is generic to the preparation of orthoesters of the formula $R'C(OR'')_3$ where R' is as above and R'' is the monovalent organic radical of an alcohol, R''OH, for example, those indicated above. Thus the invention may be employed to prepare ethyl orthoacetate, ethyl orthobenzoate, ethyl orthophenylacetate, ethyl orthocarbonate, etc.

The quantity and nature of the catalyst employed may be varied. Any acidic catalyst may be used, such as sulfuric acid, phosphoric acid, p-toluenesulfonic acid, chloroacetic acid, etc., or salts such as zinc chloride, copper sulfate, etc. Dry hydrogen chloride is a very efficient catalyst. The amount of catalyst may be varied from 0.1 to 5% or even over wider limits.

The quantities of the reactants employed may be varied widely. It is desirable to use an excess of the alkanol, or other hydroxy compound, in order to hasten the reaction. This excess may vary from 50 to 500% but is usually kept as low as possible. Sometimes, as when an expensive or rare hydroxy compound is being used, it is desirable to use an excess of the orthothioester.

The reaction need not be carried to the point where the evolved thiol has been recovered in quantitative yield. The reaction may be stopped at any point and the excess orthothioester recovered for use in another preparation. For example, it is sometimes advisable to discontinue the reaction when about 75 or 80% of the thiol had been evolved, remove the product by distillation, and add the residue of unchanged orthothioester to a new run. The time required may be appreciably shortened in this way, since the removal of the last part of the thiol is very slow and time-consuming.

The reaction temperature may be varied readily using pressures other than atmospheric. The reaction temperature for the preparation of ethyl orthoformate may be raised by carrying out the reaction at pressures in excess of atmospheric, thus increasing the rate of reaction. For high boiling materials it may be advisable to use reduced pressures. For best yields, the thiol is removed as it is formed. For orthotrithioformates, the reaction is best carried out at 20-130° C. For other trithioesters, the reaction should be carried out at temperatures below the decomposition point of the ortho trithioesters.

This invention is preferably carried out in an apparatus so designed that the reaction mixture of alcohol and alkyl orthothioester is heated with the catalyst under a column with an adjustable take-off so that the thiol can be distilled and removed from the reaction mixture as it is formed. However, this is not necessary. The method will depend mainly upon the boiling points of the reactants. The operation may be made semi-continuous by adding the ingredients slowly to a vessel where they are heated and the thiol removed. After a large amount of the desired product has been formed the addition of ingredients is stopped and the product isolated either by distillation directly from the reaction vessel or by other suitable means.

The product may be freed from traces of sulfur compounds by treatment with a small amount of mercuric chloride solution. Also in some cases it is advisable to neutralize the catalyst with sodium methylate or other base before the product is distilled from the reaction mixture. If this is not done, the orthoester is sometimes decomposed to give the normal ester and the corresponding ether. The selection of proper conditions will allow the preparation of ethers in good yields.

This invention is of use in forming alkyl orthoformates, acetates, carbonates, propionates, etc., which are of value in other synthetic work, for example, the preparation of ketals. The reaction may also be used to prepare unsaturated orthoformates, etc., of interest in polymerization studies.

This invention has its greatest advantage in the fact that it gives a method of synthesis for desired orthoformates at low cost. The methods used previously have in all cases been ones which either use expensive reagents or gave very low yields. Orthoesters have been prepared from trichloro compounds or iminoether hydrochlorides. The first method gives low yields and the second is more difficult to carry out than the method of the present invention, the reaction being very slow and requiring a week or more.

The above description and examples are intended to be illustrative only. Any modification of or variation therefrom which conforms to the spirit of the invention is intended to be included within the scope of the claims.

What is claimed is:

1. The process which comprises reacting an ester of an organic ortho trithiocarboxylic acid with an alcohol in the presence of an acidic catalyst of the class consisting of acids and acid-reacting salts.

2. The process which comprises reacting an ester of trithioorthoformic acid with an alcohol in the presence of an acidic catalyst of the class consisting of acids and acid-reacting salts.

3. The process which comprises heating an aliphatic alcohol with an alkyl trithioorthoformate in the presence of an acidic catalyst of the class consisting of acids and acid-reacting salts, the thiol formed being continuously removed, as formed, from the reaction zone.

4. The process which comprises heating ethanol with an alkyl trithioorthoformate in the presence of an acidic catalyst of the class consisting of acids and acid-reacting salts.

5. The process which comprises heating ethanol with an alkyl trithioorthoformate in the presence of an acidic catalyst of the class consisting of acids and acid-reacting salts, and continuously removing the ethanethiol formed.

6. The process which comprises heating an aliphatic alcohol with ethyl trithioorthoformate in the presence of an acidic catalyst of the class consisting of acids and acid-reacting salts.

7. The process which comprises heating an aliphatic alcohol with ethyl trithioorthoformate in the presence of an acidic catalyst of the class consisting of acids and acid-reacting salts, and continuously removing the alkanethiol formed.

8. The process which comprises heating an aliphatic alcohol with an alkyl trithioorthoformate in the presence of zinc chloride.

9. The process which comprises heating an aliphatic alcohol with an alkyl trithioorthoformate in the presence of zinc chloride, and continuously removing the aliphatic thiol formed.

10. The process which comprises heating ethanol with ethyl trithioorthoformate in the presence of zinc chloride.

11. The process which comprises heating ethanol with ethyl trithioorthoformate in the presence of zinc chloride, and continuously removing the ethanethiol formed.

12. The process which comprises heating an aliphatic alcohol with an alkyl trithioorthoformate in the presence of an acidic catalyst, which catalyst is an acid.

13. The process which comprises heating an aliphatic alcohol with an alkyl trithioorthoformate in the presence of an acidic catalyst, which catalyst is an acid, and continuously removing the aliphatic thiol formed.

14. The process which comprises heating an aliphatic alcohol with an alkyl trithioorthoformate in the presence of an acidic catalyst, which catalyst is an acid, neutralizing said acid, and isolating the aliphatic orthoformate by distillation.

15. The process which comprises heating an aliphatic alcohol with an alkyl trithioorthoformate in the presence of an acidic catalyst, which catalyst is an acid, continuously removing the aliphatic thiol formed, neutralizing said acid, and isolating the aliphatic orthoformate by distillation.

16. The process which comprises heating ethanol with ethyl trithioorthoformate in the presence of an acidic catalyst, which catalyst is an acid, neutralizing said acid, and isolating the ethyl orthoformate by distillation.

17. The process which comprises heating ethanol with ethyl trithioorthoformate in the presence of an acidic catalyst, which catalyst is an acid, continuously removing the ethanethiol formed, neutralizing said acid, and isolating the ethyl orthoformate by distillation.

WILLIAM EDWARD HANFORD.
WALTER EDWIN MOCHEL.